United States Patent
Kuenzi (10) Patent No.: US 12,052,300 B2
(45) Date of Patent: Jul. 30, 2024

(54) ENHANCED VIRTUAL CONFERENCING

(71) Applicant: Carrier Corporation, Palm Beach Gardens, FL (US)

(72) Inventor: Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/149,911

(22) Filed: Jan. 4, 2023

(65) Prior Publication Data
US 2023/0216900 A1 Jul. 6, 2023

Related U.S. Application Data

(60) Provisional application No. 63/296,561, filed on Jan. 5, 2022.

(51) Int. Cl.
*H04N 23/90* (2023.01)
*H04L 65/403* (2022.01)
*H04W 88/02* (2009.01)

(52) U.S. Cl.
CPC .......... *H04L 65/403* (2013.01); *H04N 23/90* (2023.01); *H04W 88/02* (2013.01)

(58) Field of Classification Search
CPC ........ H04N 5/272; H04N 7/157; H04N 23/90; H04N 5/278; H04N 21/2187; H04N 21/4223; H04N 21/47; H04N 5/45; H04L 12/1813; H04L 12/1818; H04L 65/1089; H04L 65/4015
See application file for complete search history.

(56) References Cited

U.S. PATENT DOCUMENTS

| | | | |
|---|---|---|---|
| 6,760,749 B1 * | 7/2004 | Dunlap | G09G 5/14 709/204 |
| 8,965,349 B2 | 2/2015 | Kieft et al. | |
| 9,007,465 B1 | 4/2015 | Fontanez et al. | |
| 9,407,834 B2 | 8/2016 | Kim et al. | |
| 9,467,648 B2 | 10/2016 | Kwon et al. | |
| 9,686,497 B1 * | 6/2017 | Terry | H04N 7/152 |

(Continued)

FOREIGN PATENT DOCUMENTS

JP 4645090 B2 3/2011

OTHER PUBLICATIONS

Homerover, "A Virtual Home Showing App For Agents & Buyers", 7 pages.

(Continued)

*Primary Examiner* — Tonia L Dollinger
*Assistant Examiner* — Linh T. Nguyen
(74) *Attorney, Agent, or Firm* — CANTOR COLBURN LLP (57) ABSTRACT

A virtual conferencing method includes receiving, at an on-premise mobile device, video data from a front-facing camera of the on-premise mobile device and a rear-facing camera of the on-premise mobile device, and receiving remote video data from a remote device, the remote video data is from a front-facing camera of the remote device. The virtual conferencing method includes simultaneously displaying, on a display of the on-premise mobile device, the video data from the front-facing camera and the rear-facing camera of the on-premise mobile device with the remote video data from the front-facing camera of the remote device.

14 Claims, 5 Drawing Sheets

(56) References Cited

U.S. PATENT DOCUMENTS

| | | | |
|---|---|---|---|
| 9,723,035 B1* | 8/2017 | Siddiqui | G16H 40/20 |
| 9,762,729 B1* | 9/2017 | Sales | H04L 61/4594 |
| 9,979,921 B2 | 5/2018 | Holmes | |
| 10,410,303 B1 | 9/2019 | Catalano | |
| 10,511,643 B2* | 12/2019 | Faulkner | H04L 65/403 |
| 11,025,861 B2 | 6/2021 | Cranfill et al. | |
| 11,151,796 B2 | 10/2021 | Holmes | |
| 11,176,627 B1 | 11/2021 | Catalano | |
| 11,837,368 B1* | 12/2023 | Helton | G16H 40/67 |
| 2009/0307610 A1 | 12/2009 | Ryan | |
| 2010/0100459 A1 | 4/2010 | Cho | |
| 2012/0221960 A1* | 8/2012 | Robinson | G06F 3/0488 |
| | | | 715/751 |
| 2014/0184721 A1* | 7/2014 | Zhang | G06F 3/048 |
| | | | 348/14.02 |
| 2016/0191582 A1 | 6/2016 | Shivaram | |
| 2017/0039867 A1* | 2/2017 | Fieldman | G09B 7/00 |
| 2019/0156406 A1 | 5/2019 | Landau et al. | |
| 2019/0295198 A1 | 9/2019 | Feizian et al. | |
| 2021/0117071 A1 | 4/2021 | Gharpuray | |
| 2022/0182557 A1* | 6/2022 | Martinez Pupo de Oliveira | |
| | | | H04N 5/272 |
| 2023/0007064 A1* | 1/2023 | Yang | G06F 3/04845 |
| 2023/0053026 A1* | 2/2023 | Wucher | G06N 20/10 |
| 2023/0069324 A1* | 3/2023 | Ifrach | H04L 65/60 |

OTHER PUBLICATIONS

Matterport, "3D virtual tours can take your business to a new dimension", 5 pages.
Redfin, "Live Video-Chat Tours", Jan. 2023, 9 Pages. https://www.redfin.com/guides/live-video-chat-tours.

* cited by examiner

ENHANCED VIRTUAL CONFERENCING

CROSS-REFERENCE TO RELATED APPLICATIONS

This application claims the benefit of U.S. Provisional Application No. 63/296,561 filed Jan. 5, 2022, all of which are incorporated herein by reference in their entirety.

BACKGROUND

The present disclosure relates to virtual conferencing, and more specifically, to enhanced virtual conferencing features for virtual conferences.

Virtual conferencing applications are often used for collaboration among several users. Users may be located in various geographic locations and can now very conveniently attend a virtual meeting. In the virtual conference environment, users are able to share audio and video with other participating users. In addition, users are able to share their workspaces or files to collaborate on a task. However, users wishing to share video data from more than one camera on their device may be required to switch between the various cameras if they wish to share different information.

BRIEF DESCRIPTION

According to an embodiment, a method for a virtual conferencing application using an on-premise mobile device is provided. The method can include receiving, at an on-premise mobile device, video data from a front-facing camera of the on-premise mobile device and a rear-facing camera of the on-premise mobile device; receiving, at the on-premise mobile device, remote video data from a remote device, wherein the remote video data is from a front-facing camera of the remote device; and simultaneously displaying, on a display of the on-premise mobile device, the video data from the front-facing camera and the rear-facing camera of the on-premise mobile device with the remote video data from the front-facing camera of the remote device.

In addition to one or more of the features described herein, or as an alternative, further embodiments include using video data from the front-facing camera and the rear-facing camera of the on-premise mobile device and the video data from the front-facing camera of the remote device comprise real-time video data.

In addition to one or more of the features described herein, or as an alternative, further embodiments include designating the on-premise mobile device based on a location of the on-premise mobile device.

In addition to one or more of the features described herein, or as an alternative, further embodiments include designating the on-premise mobile device based on a credential of the on-premise mobile device.

In addition to one or more of the features described herein, or as an alternative, further embodiments include receiving real-time text data from the remote device; and displaying the display of the on-premise mobile device the text data from the remote device in real-time.

In addition to one or more of the features described herein, or as an alternative, further embodiments include receiving video data from a plurality of remote devices; and simultaneously displaying the plurality of video data from the plurality of the remote devices.

In addition to one or more of the features described herein, or as an alternative, further embodiments include transmitting text data to the remote devices to be displayed on the display of the remote devices in real-time.

In addition to one or more of the features described herein, or as an alternative, further embodiments include transmitting real-time audio from the on-premise mobile device to the remote device; and receiving real-time audio from the remote device.

According to an embodiment, another method for virtual conferencing application using a remote mobile device is provided. The can include receiving, at a remote mobile device, video data from a front-facing camera of an on-premise mobile device and a rear-facing camera of the on-premise mobile device; receiving, at the remote mobile device, remote video data from a front-facing camera of the remote mobile device; and simultaneously displaying, on the remote mobile video, the video data from the front-facing camera and the rear-facing camera of the on-premise mobile device with the remote video data from the front-facing camera of the remote mobile device.

In addition to one or more of the features described herein, or as an alternative, further embodiments include the video data from the front-facing camera and the rear-facing camera of the on-premise mobile device and the video data from the front-facing camera of the remote device comprise real-time video data.

In addition to one or more of the features described herein, or as an alternative, further embodiments include designating the on-premise mobile device based on a location of the on-premise mobile device.

In addition to one or more of the features described herein, or as an alternative, further embodiments include designating the on-premise mobile device based on a credential of the on-premise mobile device.

In addition to one or more of the features described herein, or as an alternative, further embodiments include receiving real-time text data from the remote device; and displaying the display of the on-premise mobile device the text data from the remote device in real-time.

In addition to one or more of the features described herein, or as an alternative, further embodiments include receiving video data from a plurality of remote devices; and simultaneously displaying the plurality of video data from the plurality of the remote devices.

In addition to one or more of the features described herein, or as an alternative, further embodiments include transmitting text data to the remote devices to be displayed on the display of the remote devices in real-time.

In addition to one or more of the features described herein, or as an alternative, further embodiments include transmitting real-time audio from the on-premise mobile device to the remote device; and receiving real-time audio from the remote device.

According to an embodiment, a mobile device for a virtual conference is provided. The system can include a processor and a memory; a front-facing camera and a rear-facing camera; and a display configured to simultaneously display video data from a front-facing camera and a rear-facing camera of the mobile device with video data from a remote device.

In addition to one or more of the features described herein, or as an alternative, further embodiments include an interface to simultaneously transmit the video data from the front-facing camera and the rear-facing camera of the mobile device to the remote device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Existing conferencing applications are limited in the ability to share information such as video data. Although several users may be displayed on a display of a user device in a single session, conventional conferencing applications do not allow users to enable the sharing of both the front-facing and rear-facing cameras of a single user device. Therefore, users may be required to switch cameras of their device to share video data.

In one or more embodiments of the disclosure, the techniques described herein may be used for a real-estate showing where a real estate agent is on the premises of a property and wishes to show the property to a remote client. In other embodiments, the techniques described herein may be used by a technician that may be on-site for training or troubleshooting an issue with a remote technician. The applications are not intended to be limited by the examples described herein.

Figure 1:
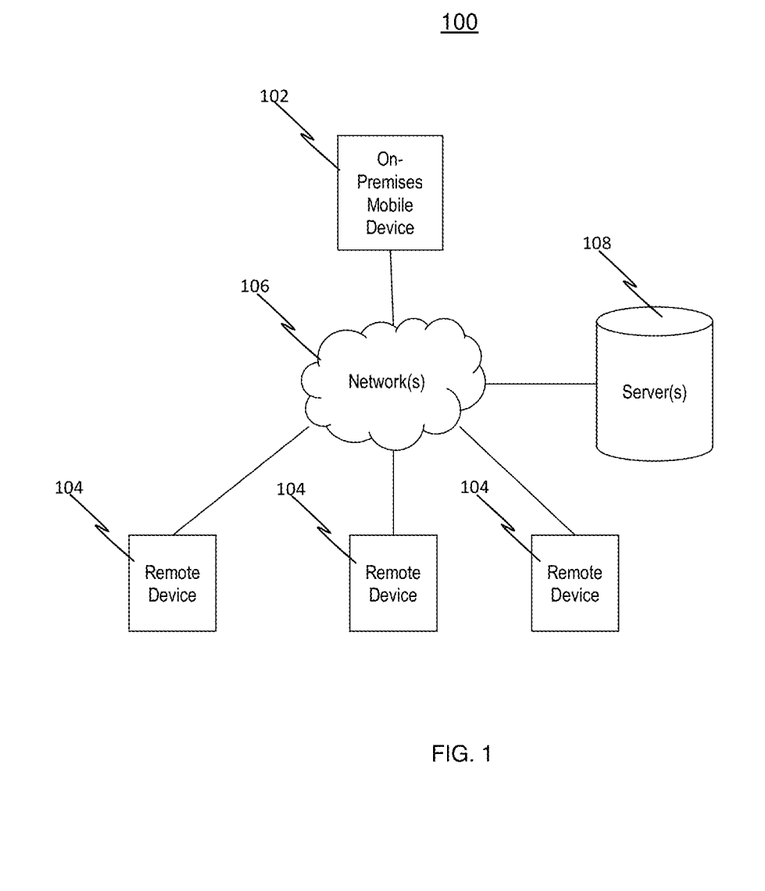
FIG. 1 depicts an exemplary system including an on-premise mobile device and a plurality of remote mobile devices in accordance with one or more embodiments of the disclosure.

Now referring to FIG. 1, system 100 for implementing virtual conferencing in accordance with one or more embodiments of the disclosure is provided. System 100 can include a plurality of user devices, which may be referred to as on-premise mobile devices 102 and/or remote devices 104. In some embodiments, the user devices may be a laptop computer, a tablet computer, a netbook computer, a personal computer (PC), a desktop computer, a personal digital assistant (PDA), a smart phone, and/or other suitable programmable electronic devices capable of communicating with various components and devices within system 100.

As mentioned above, both the on-premise mobile device 102 and the remote devices 104 may be user devices. On-premise mobile device 102 can be configured to communicate with remote devices 104 over a network 106. The network(s) 106 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. In other embodiments, on-premise mobile device 102 may be configured to communicate directly with remote devices 104 without exchanging data over the network 106.

Also shown in FIG. 1, system 100 can include a server 108 which may be configured to host the application for on-premise mobile device 102 and remote devices 104. Server 108 can also be configured to execute additional features for system 100.

Figure 2:
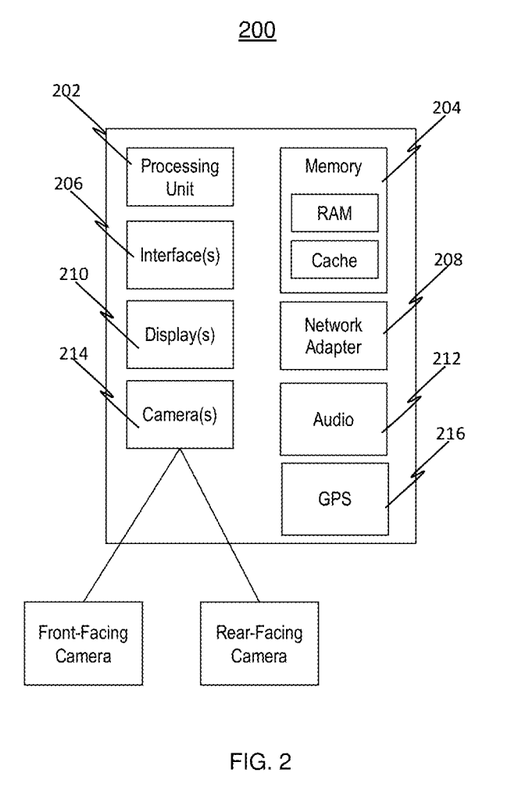
FIG. 2 depicts an exemplary block diagram of one or more components of an on-premise mobile device or a remote device in accordance with one or more embodiments of the disclosure.

Referring now to FIG. 2, exemplary device 200 which may be representative of any on-premise mobile device 102 and/or remote devices 104 of FIG. 1 is shown. User device 200 is only illustrative and is not intended to suggest any limitation as to the scope of use or functionality of embodiments of the invention described herein.

As shown in FIG. 2, device 200 is shown in the form of a general-purpose computing device. The components of device 200 may include, but are not limited to, one or more processors 202, a memory 204, interface 206, and network adapter 208. In one or more embodiments of the disclosure, the processor 202 can include a processor 202 of a general-purpose computer, special purpose computer, or other programmable data processing apparatus configured to execute instruction via the processor of the computer or other programmable data processing apparatus.

Device 200 can include a variety of computer system readable media. Such media may be any available media that is accessible by device 200, and it includes both volatile and non-volatile media, removable and non-removable media. Memory 204 can include computer system readable media. The memory 204 can include any one or combination of volatile memory elements (e.g., random access memory (RAM, such as DRAM, SRAM, SDRAM, etc.)) and non-volatile memory elements (e.g., ROM, erasable programmable read-only memory (EPROM), electronically erasable programmable read-only memory (EEPROM), etc.). Device 200 may further include other removable/non-removable, volatile/non-volatile computer system storage media. The processor 202 and a memory 204 are configured to carry out the operations for the device 200.

The memory 204 may include one or more program modules (not shown) such as operating system(s), one or more application programs, other program modules, and program data. Each of the operating systems, one or more application programs, other program modules, and program data or some combination thereof, may include an implementation of a networking environment. The program modules generally carry out the functions and/or methodologies of embodiments of the invention as described herein.

Device 200 may also communicate with one or more external devices through the interface 206 such as a keyboard, a pointing device, a display 210, audio 212, etc.; one or more devices that enable a user to interact with device 200; and/or any devices (e.g., network card, modem, etc.) that enable device 200 to communicate with one or more other computing devices. Device 200 may also be equipped with a GPS module 216 for determining the location of the device 200 using known techniques. It can be appreciated that other techniques for determining the location of device 200 using other techniques such as triangulation of cellular signals, Wi-Fi signals, etc. and is not limited by the examples discussed herein. In addition, device 200 may include one or more camera(s) 214. Camera 214 may comprise a front-facing camera that is arranged on a front face of device 200, i.e., the side of the device including the display 210 and/or user interface. Camera 214 can also include a rear-facing camera that is arranged on the opposite side of the front-facing camera.

Still yet, device 200 can communicate with one or more networks such as a local area network (LAN), a general wide area network (WAN), and/or a public network (e.g., the Internet) via network adapter 208. As depicted, network adapter 208 communicates with the other components of device 200.

It should be understood that although not shown, other hardware and/or software components could be used in conjunction with device 200. It can be appreciated the device 200 can include other components or modules and is not limited by the components shown in FIG. 2. Device 200 may be equipped with front-facing cameras and rear-facing cameras.

Figure 3:
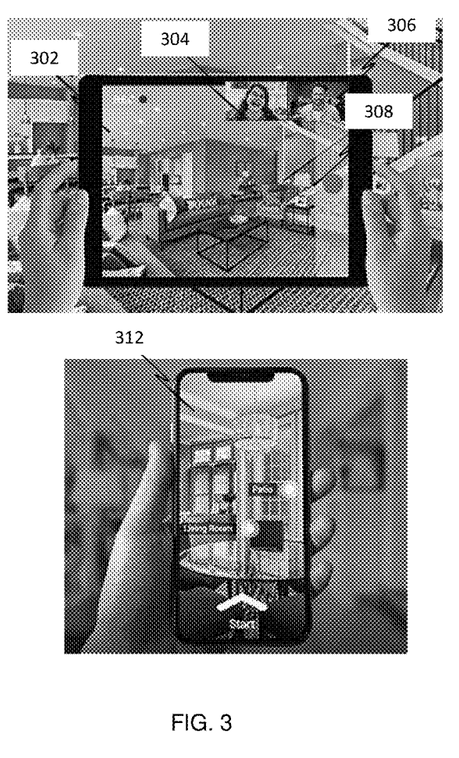
FIG. 3 depicts an exemplary perspective view of a display of an on-premise mobile device or a remote device in accordance with one or more embodiments of the disclosure.

FIG. 3 depicts an example display, such as the display 210, during a virtual conference in accordance with one or more embodiments of the disclosure. As shown in the first display 302, video data from a front-facing camera and a rear-facing camera of an on-premise mobile device 102 and a front-facing camera of a remote device 104 are provided. In a non-limiting example, a portion 304 of the display 302 can be configured to display video data from a front-facing camera of the on-premise mobile device 102, and a portion 308 of the display 302 can be configured to simultaneously display video data from the rear-facing camera of the on-premise mobile device 102. As a non-limiting example, portion 304 shows a user's face while portion 308 shows the environment, i.e., a home showing, captured by the rear-facing camera. The on-premise mobile device 102 is configured to simultaneously transmit video data from the front-facing camera and the rear-facing camera to another device for viewing. A portion 306 of the display 302 can be configured to display video data from a front-facing camera of a remote device 104, i.e., a remote user. Although only two users are shown in portions 304, 308, it can be appreciated that a plurality of remote users using respective remote devices that may be displayed on a display 302.

Also shown in FIG. 3, a display 312 is shown in which a user may provide inputs to label the video data from the rear-facing camera of the on-premise mobile device 102. In this non-limiting example, the rear-facing camera is used in a real-estate agent property showing where a user has labeled the "patio" and the "living room" which is shown on the display of the on-premise mobile device 102 or remote device 104. Display 312 is shown only as an example, and the illustration is not intended to limit the scope of the embodiments of the disclosure.

Figure 4:
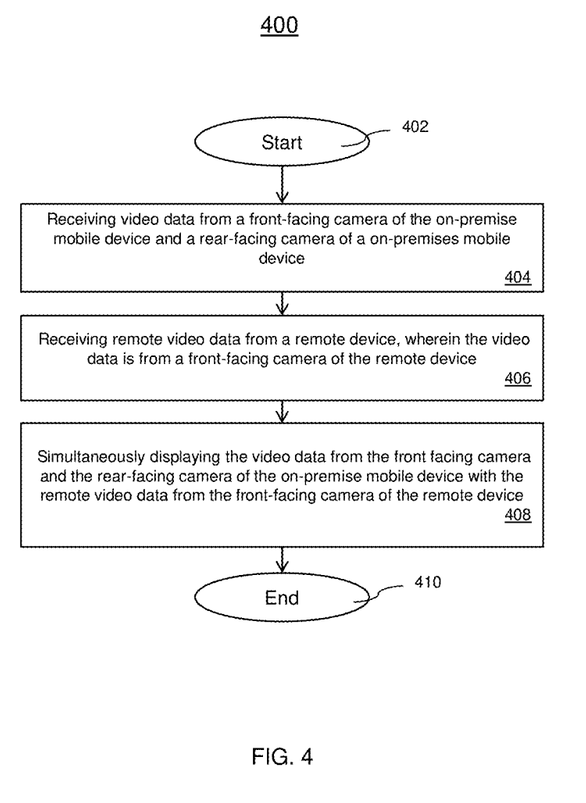
FIG. 4 depicts a flowchart of a method for using an on-premise mobile device in accordance with one or more embodiments of the disclosure.

FIG. 4 depicts a flowchart of a method 400 for implementing a virtual conference using an on-premise mobile device 102 in accordance with one or more embodiment of the disclosure. Method 400 can be implemented in system 100 or devices 200 shown in FIGS. 1-3. Method 400 begins at block 402 and proceeds to block 404 which receiving, at an on-premise mobile device, video data from a front-facing camera of the on-premise mobile device and a rear-facing camera of the on-premise mobile device. In one or more embodiments of the disclosure, the on-premise mobile device may be designated based on a location of the on-premise mobile device or based on a credential of the on-premise mobile device. The on-premise mobile device GPS location or credentials may be transmitted to and stored in a server, where a comparison of the information with pre-determined authorization information for the on-premise mobile device may be used to designate the on-premise mobile device. In one or more embodiments of the disclosure, the on-premise mobile device my be authorized by comparing the device's current location to a street address for the premises that may be stored in the server. In a different embodiment, the authorization for the on-premise mobile device can be provided by comparing the device's current location to a threshold distance from the home (premises) that is listed for sale, where the home listing information can be stored in the server. It can be appreciated that other techniques can be used to provide authorization to the on-premise device.

In further embodiments, the direction and/or orientation of the on-premise device can be detected using the location information and provided to the remote device. The direction of the on-premise device can be displayed on the screen of the remote device using an arrow/indicator. The remote device can be configured to place a request to the on-premise device to turn, pan-up/down, etc. to change its field of view which is presented to the remote device. The user of the remote device is able to provide an input on the display of the device, i.e., clicking a visual button on the screen of the device, to provide a request to the on-premise device to change their field of view. The detection of the motion can be automatic or can be manual executed by user input.

At block 406, the on-premise mobile receives video data from a remote mobile device, wherein the video data is from a front-facing camera of the remote mobile device. The video data from the front-facing camera and the rear-facing camera of the on-premise mobile device and the video data from the front-facing camera of the remote device can include real-time data. In one or more embodiments of the disclosure, real-time data can include text data from the remote device and may be displayed on a display of the on-premise mobile device. Also, video data may be received from a plurality of remote devices and may simultaneously display the plurality of video data from the plurality of the remote devices on the display of the on-premise mobile device.

At block 408, the on-premise mobile simultaneously displays the video data from the front-facing camera and the rear-facing camera of the on-premise mobile device with the video data from the front-facing camera of the remote mobile device. In one or more embodiments of the disclosure, the on-premise mobile device is configured to transmit the video data from its front-facing camera and rear-facing camera to other devices for display.

Method 400 ends at block 410. The process flow diagram of FIG. 4 is not intended to indicate that the operations of the method 400 are to be executed in any particular order, or that all of the operations of method 400 are to be included in every case. Additionally, method 400 can include any suitable number of additional operations.

Figure 5:
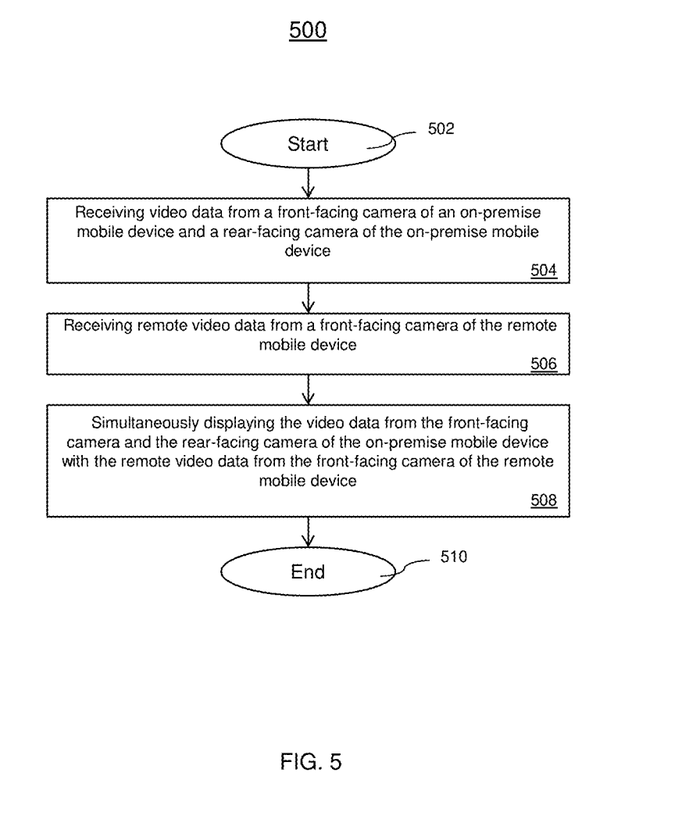
FIG. 5 depicts a flowchart of an exemplary method for using a remote mobile device in accordance with one or more embodiments of the disclosure.

FIG. 5 depicts a flowchart of a method 500 for implementing an agent virtual mobile showing using a remote mobile device in accordance with one or more embodiment of the disclosure. Method 500 begins at block 502 and proceeds to block 504 which provides receiving, at a remote device, video data from a front-facing camera of an on-premise mobile device and a rear-facing camera of the on-premise mobile device. At block 506, the remote mobile device receives video data from a front-facing camera of the remote mobile device. At block 508, the remote mobile device simultaneously displays the video data from the front-facing camera and the rear-facing camera of the on-premise mobile device with the video data from the front-facing camera of the remote mobile device. In one or more embodiments of the disclosure, the video session can be recorded or pictures of specific points of the video session may be taken and subsequently recalled at a later time.

Method 500 ends at block 510. The process flow diagram of FIG. 5 is not intended to indicate that the operations of method 500 are to be executed in any particular order, or that all of the operations of method 500 are to be included in every case. Additionally, method 500 can include any suitable number of additional operations.

In other embodiments, either the on-premise device or the remote device can be configured to allow a user to input text data on various parts of the scene of the video session to annotate items shown in the display. The annotations can be shown/retrieved based on augmented reality. Both of the devices, the on-premise device and the remote device can be configured to view the same annotations on the screen. In such a scenario, a real-estate agent and a client can view the same annotations on their respective displays during the video session. Additionally, either the remote or on-premise device can be configured to share the video of the rear-facing camera (i.e. the view of the home being shown), and the resulting zoomed video will be mirrored on both the on-premise and remote devices so the agent and the client are viewing the same scene.

The technical effects and benefits include obviating the need for a user device in a virtual conference from switching from a front-facing camera and a rear-facing camera to share data. The techniques described herein allow a user to simultaneously share its video data and further the video data may be transmitted and simultaneously displayed on another device.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for a virtual conference using an on-premise mobile device, the method comprising:
   receiving, at an on-premise mobile device, video data from a front-facing camera of the on-premise mobile device and a rear-facing camera of the on-premise mobile device;
   receiving, at the on-premise mobile device, remote video data from a remote device, wherein the remote video data is from a front-facing camera of the remote device;
   simultaneously displaying, on a display of the on-premise mobile device, the video data from the front-facing camera and the rear-facing camera of the on-premise mobile device with the remote video data from the front-facing camera of the remote device;
   wherein the video data from the front-facing camera and the rear-facing camera of the on-premise mobile device and the video data from the front-facing camera of the remote device comprise real-time video data;
   receiving real-time text data from the remote device;
   displaying on the display of the on-premise mobile device the text data from the remote device in real-time, the text data from the remote device being displayed as annotations on the video data from rear-facing camera of the on-premise mobile device;
   receiving real-time text data from the on-premise mobile device; and
   displaying on the display of the on-premise mobile device the text data from the on-premise mobile device in real-time, the text data from the on-premise mobile device being displayed as annotations on the video data from rear-facing camera of the on-premise mobile device.

2. The method of claim 1, further comprising designating the on-premise mobile device based on a location of the on-premise mobile device.

3. The method of claim 1, further comprising designating the on-premise mobile device based on a credential of the on-premise mobile device.

4. The method of claim 1, further comprising receiving video data from a plurality of remote devices; and
   simultaneously displaying the plurality of video data from the plurality of the remote devices.

5. The method of claim 1, further comprising transmitting text data to the remote devices to be displayed on the display of the remote devices in real-time.

6. The method of claim 1, further comprising transmitting real-time audio from the on-premise mobile device to the remote device; and
   receiving real-time audio from the remote device.

7. A method for a virtual conference using a remote device, the method comprising:
   receiving, at a remote device, video data from a front-facing camera of an on-premise mobile device and a rear-facing camera of the on-premise mobile device;
   receiving, at the remote device, remote video data from a front-facing camera of the remote device; and simultaneously displaying, on the remote device, the video data from the front-facing camera and the rear-facing camera of the on-premise mobile device with the remote video data from the front-facing camera of the remote device;

wherein the video data from the front-facing camera and the rear-facing camera of the on-premise mobile device and the video data from the front-facing camera of the remote device comprise real-time video data;

receiving real-time text data from the remote device;

displaying on the display of the remote device the text data from the remote device in real-time, the text data from the remote device being displayed as annotations on the video data from rear-facing camera of the on-premise mobile device;

receiving real-time text data from the on-premise mobile device; and displaying on the display of the remote device the text data from the on-premise mobile device in real-time, the text data from the on-premise mobile device being displayed as annotations on the video data from rear-facing camera of the on-premise mobile device.

8. The method of claim 7, further comprising designating the on-premise mobile device based on a location of the on-premise mobile device.

9. The method of claim 7, further comprising designating the on-premise mobile device based on a credential of the on-premise mobile device.

10. The method of claim 7, further comprising receiving video data from a plurality of remote devices; and
   simultaneously displaying the plurality of video data from the plurality of the remote devices.

11. The method of claim 7, further comprising transmitting text data to the remote devices to be displayed on the display of the remote devices in real-time.

12. The method of claim 7, further comprising transmitting real-time audio from the on-premise mobile device to the remote device; and
   receiving real-time audio from the remote device.

13. A mobile device for a virtual conference, the system mobile device comprising:
   a processor and a memory;
   a front-facing camera and a rear-facing camera; and
   a display configured to simultaneously display video data from a front-facing camera and a rear-facing camera of the mobile device with video data from a remote device;
   wherein the video data from the front-facing camera and the rear-facing camera and the video data from the remote device comprise real-time video data;
   the mobile device configured to:
      receive real-time text data from the remote device;
      display on the display of the mobile device the text data from the remote device in real-time, the text data from the remote device being displayed as annotations on the video data from rear-facing camera of the mobile device;
      receiving real-time text data from the mobile device; and
      displaying on the display of the mobile device the text data from the mobile device in real-time, the text data from the mobile device being displayed as annotations on the video data from rear-facing camera of the mobile device.

14. The mobile device of claim 13, further comprising an interface to simultaneously transmit the video data from the front-facing camera and the rear-facing camera of the mobile device to the remote device.

* * * * *